United States Patent [19]
Matzner et al.

[11] Patent Number: 5,267,291
[45] Date of Patent: Nov. 30, 1993

[54] SPACER BAND WITH OPTIMIZED FUEL BUNDLE TO CHANNEL CLEARANCE IN A BOILING WATER REACTOR

[75] Inventors: Bruce Matzner; James E. Wood, both of San Jose, Calif.

[73] Assignee: General Electric Company, San Jose, Calif.

[21] Appl. No.: 838,999

[22] Filed: Feb. 21, 1992

[51] Int. Cl.$^5$ .............................................. G21C 3/34
[52] U.S. Cl. ................................... 376/442; 376/439; 376/438; 376/444
[58] Field of Search ............... 376/442, 439, 438, 444, 376/448; 976/DIG. 68, DIG. 78

[56] References Cited

U.S. PATENT DOCUMENTS

| | | | |
|---|---|---|---|
| 3,820,225 | 6/1974 | Iwao et al. | 29/428 |
| 3,852,154 | 12/1974 | Carlson et al. | 376/442 |
| 4,224,107 | 9/1980 | Delafosse et al. | 376/462 |
| 4,508,679 | 4/1985 | Matzner et al. | 376/438 |
| 4,544,522 | 10/1985 | Curulla et al. | 376/441 |

Primary Examiner—Donald P. Walsh
Assistant Examiner—Meena Chelliah
Attorney, Agent, or Firm—John S. Beulick

[57] ABSTRACT

In a fuel bundle for a boiling water nuclear reactor, modification of the spacers at the peripheral spacer band is made to maintain a more uniform spacing of the peripheral fuel rods from the channel walls to avoid critical power limitations. The conventional fuel bundle construction include a plurality of side-by-side sealed vertically disposed nuclear fuel rods in a square array supported at a lower tie plate, at least some of the fuel rods fastened to an upper tie plate, and held in designed spaced apart relation as a unitary mass by intermittent vertically placed spacers. A square sectioned channel surrounds the upper tie plate, the lower tie plate, and the fuel rods and spacers therebetween. The square sectioned channel functions to confined fluid flow interior of the fuel bundle between the tie plates and through the fuel rods. At the same time, the channel separates a core bypass region exterior of the channel having high moderator density from the flow path interior of the fuel bundle. The spacers are modified at their peripheral band to prevent the spacer confined group of fuel rods closing on the channel wall due to overall migration of the fuel rods as a group held together by the spacers. According to the invention, two adjacent spacer sides are formed with at least two protrusions—typically in the form of bubble like projections, these protrusions occupying the entire interval necessary to maintain the fuel rods adjacent the sides at their full optimal spacing from the interior channel walls. Similarly, the remaining two adjacent spacer sides are formed with protrusions—again in the form of bubble like projections, these protrusions occupying a sufficient interval to prevent inadvertent closing of the fuel rods to the channel sides beyond a worst case limit. This worst case limit is chosen to provide the peripheral fuel rods with adequate clearance to avoid critical power limitation and yet leave sufficient clearance between the peripheral band and the channel so that the channel may be conveniently assembled to the fuel bundle. On these two remaining sides of the peripheral spacer band, leaf springs are added. These leaf springs are preferably vertical in their longitudinal dimension, fastened to the band at one end, bulged outwardly toward the channel in the middle, and bent inwardly and bearing in sliding relation on the band at the opposite end. In operation, the leaf springs are given sufficient force to bias the fuel rod matrix at the spacer away from the channel wall. Such biasing registers the full dimension protrusions to the channel wall at the opposite sides of the spacer and uniformly spaces the peripheral fuel rods with respect to the channel. Bundle critical power is enhanced.

9 Claims, 3 Drawing Sheets

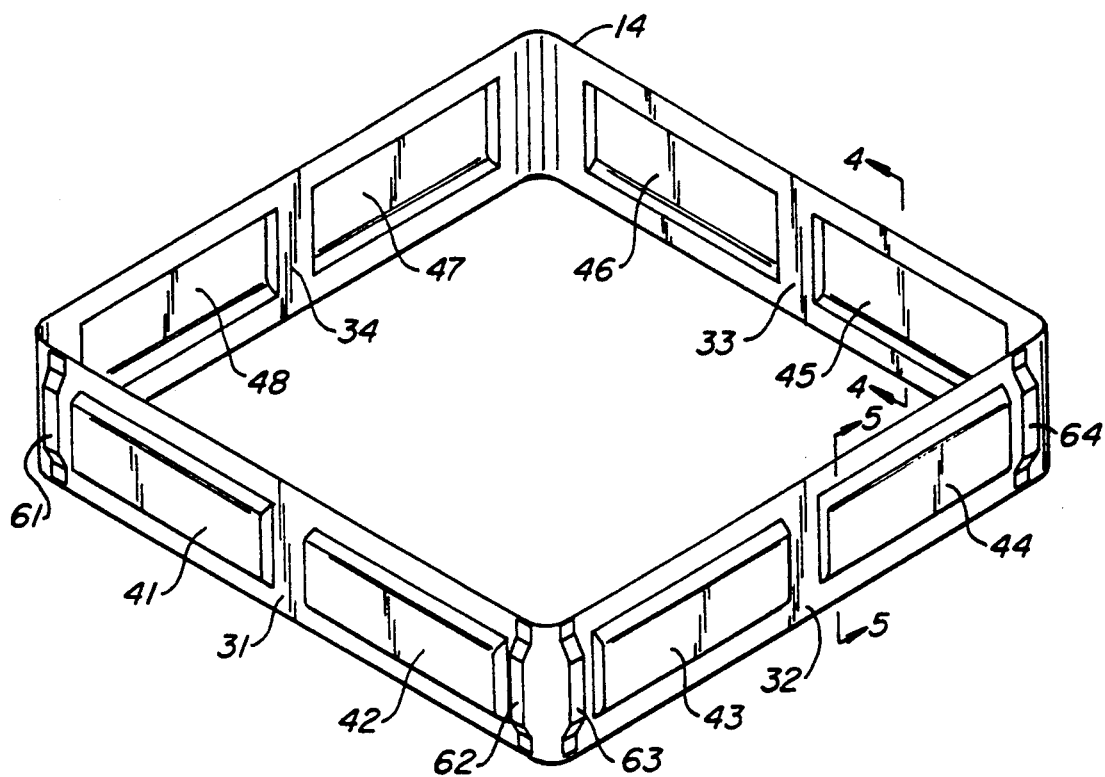
FIG. 3.
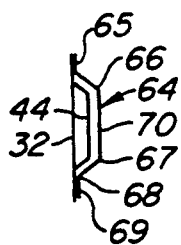
FIG. 4.
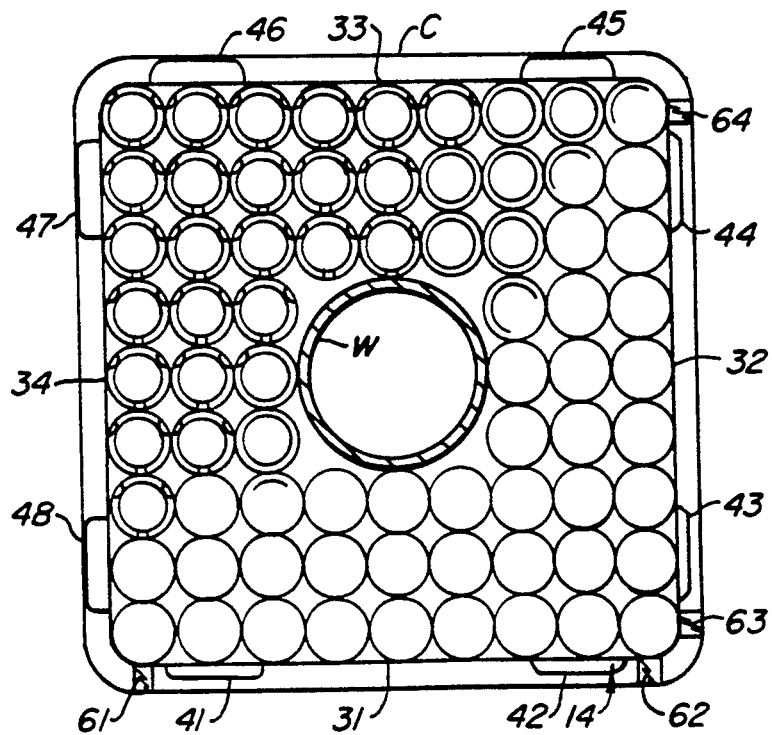
FIG. 5.
FIG. 6.

SPACER BAND WITH OPTIMIZED FUEL BUNDLE TO CHANNEL CLEARANCE IN A BOILING WATER REACTOR

This invention relates to boiling water nuclear reactor fuel bundles and their fuel rod spacers and channels. More particularly, a fuel rod spacer with a surrounding band is disclosed in which sizing of the band at protrusions with respect to the immediately surrounding channel occurs to maintain the optimum clearance between the peripheral fuel rods within the fuel bundle and the channels of the fuel rods. Improved critical power performance results.

BACKGROUND OF THE INVENTION

Boiling water nuclear reactors have reactor cores composed of two moderator flow regions. These regions include the flow region through the reactor core and the flow region through the so-called core bypass region. In understanding these flow regions, the construction of the regions will first be set forth. Thereafter, the thermal hydraulic and nuclear characteristics of both regions will be discussed.

The reactor core includes a plurality of side-by-side fuel bundles, these bundles being square in section and vertically elongate in dimension. The fuel bundles each include a matrix of sealed and vertically upstanding fuel rods supported on a lower tie plate. The lower tie plate serves to admit water moderator through the bottom of the fuel bundle about the rods for steam generation. A upper tie plate typically fastens to at least some of the fuel rods and permits the exit of water and generated steam from the fuel bundle. A channel surrounds the lower tie plate, the upper tie plate and the fuel rods therebetween. This channel serves to confine the flow path through the fuel bundle. At the same time, this channel and its flow path separate the fuel bundle flow interior of the channel from the core by-pass region exterior of the channel.

So-called fuel rod spacers are placed at selected vertical intervals along the length of the fuel bundle. These spacers maintain the otherwise long a flexible fuel rods from coming into abrading contact one with another under the dynamics of fluid flow within the reactor as well as to maintain the designed fuel rod to fuel rod spacing for optimum nuclear performance. This being the case, each fuel rod spacer defines a matrix position for each fuel rod at the particular elevation of the spacer. Each fuel rod is confined by the spacer to a designed spaced apart position with respect to all of the adjacent fuel rods.

The spacers are typically surrounded at a band. It is the function of this band to provide an outer defining envelope for the spacer cells into which fuel rods can be placed.

Assembly of the fuel bundle can be summarized. Typically the lower tie plate and spacers are placed in their final spatial relation. Thereafter the fuel rods are threaded through the spacers at each matrix position and registered to the lower tie plate. Thereafter the upper tie plate is fitted over the assembly. Finally, the fuel bundle has the channel placed over its exterior surface.

The operation of the fuel bundle from the thermal hydraulic stand point can be simply stated. Water moderator coolant is inlet from the bottom of the fuel bundle through the lower tie plate. Increasing fractions of vapor are generated as the moderator passes upwardly within the channel between the fuel rods through the fuel bundle with exit of the water and generated steam at and through the upper tie plate at the top of the fuel bundle.

Operation of the fuel bundle from the nuclear stand point can likewise be simply stated. The water moderator within and about the fuel bundle takes the fast neutrons generated by the atomic reaction and slows or thermalizes these neutrons when the neutrons pass through the moderator. In the slow or thermalized state, the neutrons are capable of promoting the continuous chain reaction required to keep the reactor operating. It is to be understood that the density of the water moderator is an important factor in allowing the nuclear reaction to continue. Where the moderator is relatively dense—as for example where it consists of pure water—the fast neutrons are rapidly thermalized and the reaction abundantly continues. Where the moderator is not dense and contains large vapor fractions—the fast neutrons are not rapidly thermalized and among other things the reaction is not as abundant in its continuation.

Having summarized the operation of the fuel bundles, the construction of the core bypass region can now be set forth. Simply stated, the core bypass region is defined by the exterior of the fuel bundles as they are arrayed within the reactor core in spaced apart side-by-side relation. As the square sectioned fuel bundles are placed together, they are spaced apart so as to define cruciform sectioned (that is "cross shaped") interstitial spaces. These spaces interconnect in a continuous matrix between all the fuel bundles. This interconnected matrix defines the core bypass region. This region accommodates the reactor control blades during reactor shut down and is flooded with water during reactor operation.

The function of the reactor control blades is well known. These control blades are typically cruciform sectioned members. These cruciform sectioned members typically fit interstitially in the complimentary shaped cruciform core bypass region defined by the adjacent but spaced apart fuel bundles. When the cruciform shaped control blades are inserted to the cruciform shaped interstices between the fuel bundles of the core bypass region, they control and even shut down the nuclear reaction. The control blades in a boiling water reactor are typically inserted from below the reactor between the fuel rods displacing water in the core bypass region and absorbing the thermal neutrons.

The function of the core bypass region during operation is also well known. The control rods are in large measure withdrawn. Water occupies this region immediately upon control rod withdrawal and immediately adjoins the fuel bundles at the channel walls. The water is on the outside of the channel walls; the fuel is on the inside of the channel walls. The water in this core bypass region—when not displaced by the fuel rods—serves further to moderate the fast neutrons emitted by the nuclear reaction to the slow or thermalized state where these neutrons may continue the nuclear reaction. In this sense, the core bypass region is a particularly important source of nuclear moderator immediate the outside of every fuel bundle.

Having explained the nuclear function of the core bypass region, attention can be directed to the fuel rods within the fuel bundle immediately adjacent the channel. This attention will first consider the unique nuclear position of these fuel rods and thereafter the thermal hydraulic limitations of these fuel rods.

From a nuclear operational view, the fuel rods adjacent the channel are typically the most reactive fuel locations in the fuel bundle of a boiling water reactor. Because the moderator of the core bypass region is immediately available, these fuel rods—especially in the early life of a fuel bundle—tend to be the most reactive. Consequently, they generate the most power and easily come under so-called "critical power" limits. When a fuel rod approaches critical power limits, the heat generated by the fuel bundle exceeds the ability of the coolant to remove the heat; the excess heat become a threat to the integrity of the cladding of the fuel rod surrounding the nuclear fuel. When this limit is approached, the entire remainder of the fuel bundle is limited in performance so that the critical power limit is not exceeded at any one individual portion of a fuel bundle.

From the thermal hydraulic operational view, the peripheral fuel rods must be provided with an adequate flow of coolant to prevent these fuel rods from exceeding the critical power limits.

DISCOVERY

It should be understood that clearance between the channel inside walls and the chamber wall contact points on the spacers (commonly called bathtubs) exists in present fuel designs. Thus, conventional spacer designs allow movement of the fuel rods as confined by the spacers as a mass with respect to the channel. Such movement can be caused by many forces within the reactor. This movement of the spacer and the fuel rods as a group with respect to the channel enables the outside fuel rods to move in spatial relation towards and away from the channel walls. Typically, overall movement of the fuel rod matrix at the spacer occurs with fuel rods on one bundle side moving away from one channel wall while fuel rods on the opposite side move adjacent an opposite channel wall.

When any outside fuel rods close in on and become adjacent to a channel wall, the flow of the moderating coolant is inhibited at these highly reactive outside fuel rods. Critical power losses of as much as 6% can be experienced by these fuel rods adjacent the channel—and especially those fuel rods adjacent the corners of the channel. As a result, the entire fuel bundle must be limited in its performance so that these critical power limits of the peripheral fuel rods are not exceeded.

INVENTION

SUMMARY OF THE INVENTION

In a fuel bundle for a boiling water nuclear reactor, modification of the spacers at the peripheral spacer band is made to maintain a more uniform spacing of the peripheral fuel rods from the channel walls to avoid critical power limitations. The conventional fuel bundle construction include a plurality of side-by-side sealed vertically disposed nuclear fuel rods in a square array supported at a lower tie plate, at least some of the fuel rods fastened to an upper tie plate, and held in designed spaced apart relation as a unitary mass by intermittent vertically placed spacers. A square sectioned channel surrounds the upper tie plate, the lower tie plate, and the fuel rods and spacers therebetween. The square sectioned channel functions to confined fluid flow interior of the fuel bundle between the tie plates and through the fuel rods. At the same time, the channel separates a core bypass region exterior of the channel having high moderator density from the flow path interior of the fuel bundle. The spacers are modified at their peripheral band to prevent the spacer confined group of fuel rods closing on the channel wall due to overall migration of the fuel rods as a group held together by the spacers. According to the invention, two adjacent spacer sides are formed with at least two protrusions—typically in the form of bubble like projections, these protrusions occupying the entire or any fraction of the interval necessary to maintain the fuel rods adjacent the sides at their full optimal spacing from the interior channel walls. Similarly, the remaining two adjacent spacer sides are formed with protrusions—again in the form of bubble like projections, these protrusions occupying a sufficient interval to prevent inadvertent closing of the fuel rods to the channel sides beyond a worst case limit. This worst case limit is chosen to provide the peripheral fuel rods with adequate clearance to avoid critical power limitation and yet leave sufficient clearance between the peripheral band and the channel so that the channel may be conveniently assembled to the fuel bundle. On these two remaining sides of the peripheral spacer band, preferably leaf springs (or some other suitable spring design) are added. These leaf springs are preferably vertical in their longitudinal dimension, fastened to the band at one end, bulged outwardly toward the channel in the middle, and bent inwardly and bearing in sliding relation on the band at the opposite end. In operation, the leaf springs are given sufficient force to bias the fuel rod matrix at the spacer away from the channel wall. Such biasing registers the full dimension protrusions to the channel wall at the opposite sides of the spacer and uniformly spaces the peripheral fuel rods with respect to the channel. Bundle critical power is enhanced.

With respect to this invention and the so-called "worst case" dimension, it is to be understood that it is the maximum critical power of the outer fuel rods which is achieved by the centering apparatus and process set forth herein. This has been determined and can be determined by running tests to establish worst case clearances and taking the most conservative results for the outer rods. It will be appreciated that where the interior rods are limiting, the disclosed placement scheme has no value.

Further, it will be understood that at assembly of the fuel bundle, the highest power fuel rods can usually be identified, prior to the placement of the fuel bundle into the reactor. Naturally, these fuel rods will be fitted to the adjacent spacer sides occupying the full spacer interval from the channel. The remaining fuel bundle sides having the fuel rods with a lesser critical power will be assigned to the "worst case" limit.

BRIEF DESCRIPTION OF THE DRAWINGS

FIG. 3 is a perspective of a spacer band showing two adjacent spacer sides having protrusions occupying the full interval with respect to adjacent channel walls and the remaining two adjacent spacer sides occupying a partial interval, these latter sides including a leaf spring for the bias of the fuel bundle to a centered position with respect to the spacer;

FIG. 4 is a section of the spacer band of FIG. 3 along lines 4—4 of FIG. 3;

FIG. 5 is a section of the spacer band of FIG. 3 along lines 5—5 of FIG. 3;

FIG. 6 is a plan section of a fuel bundle with the leaf springs centering the fuel bundle with respect to the channel in accordance with this invention.

DESCRIPTION OF THE PREFERRED EMBODIMENT

Figure 1:
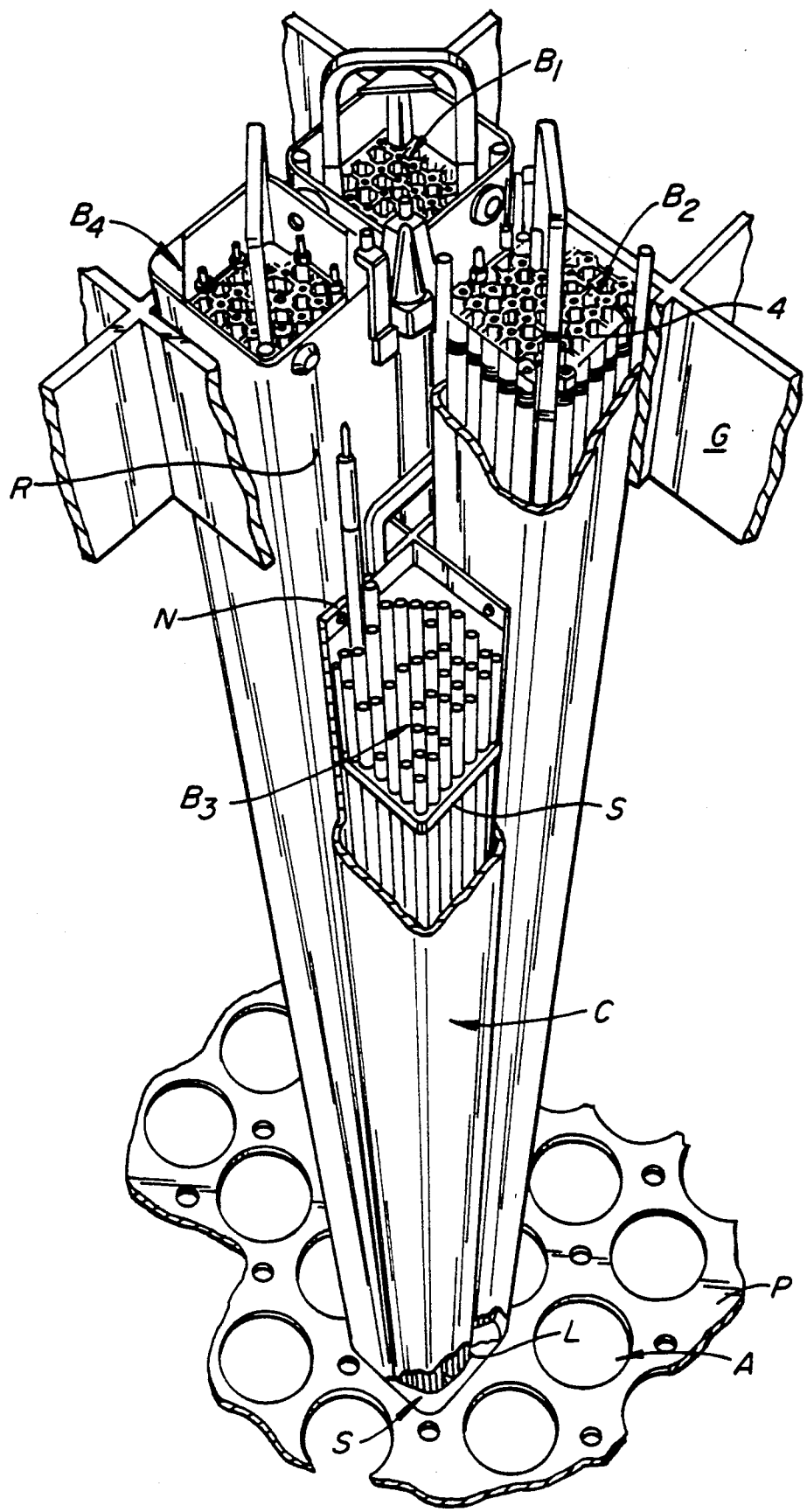
FIG. 1 is a perspective sectional view of the prior art taken looking down on a nuclear reactor illustrating a fuel bundle with the fuel bundle flow region and a control rod within the core bypass region.

Referring to FIG. 1, a perspective of a nuclear reactor core of a boiling water nuclear reactor is illustrated at four adjacent fuel bundles B1-B4. The four fuel bundles B1-B4 rest on fuel support S at the lower end and extend upwardly to a top guide G. Sealed fuel rods R extend from lower tie plate L above core support S to upper tie plate U. As can be seen lower tie plate L, fuel rods R, and upper tie plate U are all surrounded by channels C. In the case of fuel bundle B3, channel C and rods R are shown broken away without the upper tie plate U. Sufficient breaking away has occurred to expose one spacer S.

Flow within the fuel bundles B1-B4 is easy to understand. Water flows into the fuel bundles B1-B4 from below core plate P at support S where the flow is distributed by fuel support S to equal flow among fuel bundles B1-B4. Flow through the lower tie plate of water occurs. The water passes upwardly confined by channels C and finally out of up tie plate U. During this flow the channels C separate flow interior of the fuel bundle from core bypass region R between the fuel bundles.

It will be noted that fuel bundles B1-B4 are square in section and held in spaced apart relation with respect to one another. This being the case, it will be understood that the respective fuel bundles define a cruciform interstices of the core bypass region R. In the sketch here, a control blade N is shown partially inserted for control of the reaction. During normal operation, the control blade N is withdrawn, core bypass region R flooded, and reaction continues aided by the moderating effect of water moderator in region R.

Flow to core bypass region R is well known and will not be specifically illustrated here. It will suffice to say that certain metering apertures at the bottom of fuel bundles B1-B4 and other reactor leakage paths maintain this region flooded with liquid moderator. Sufficient flow is provided to the region to prevent flashing of the contained water moderator to steam.

Figure 2:
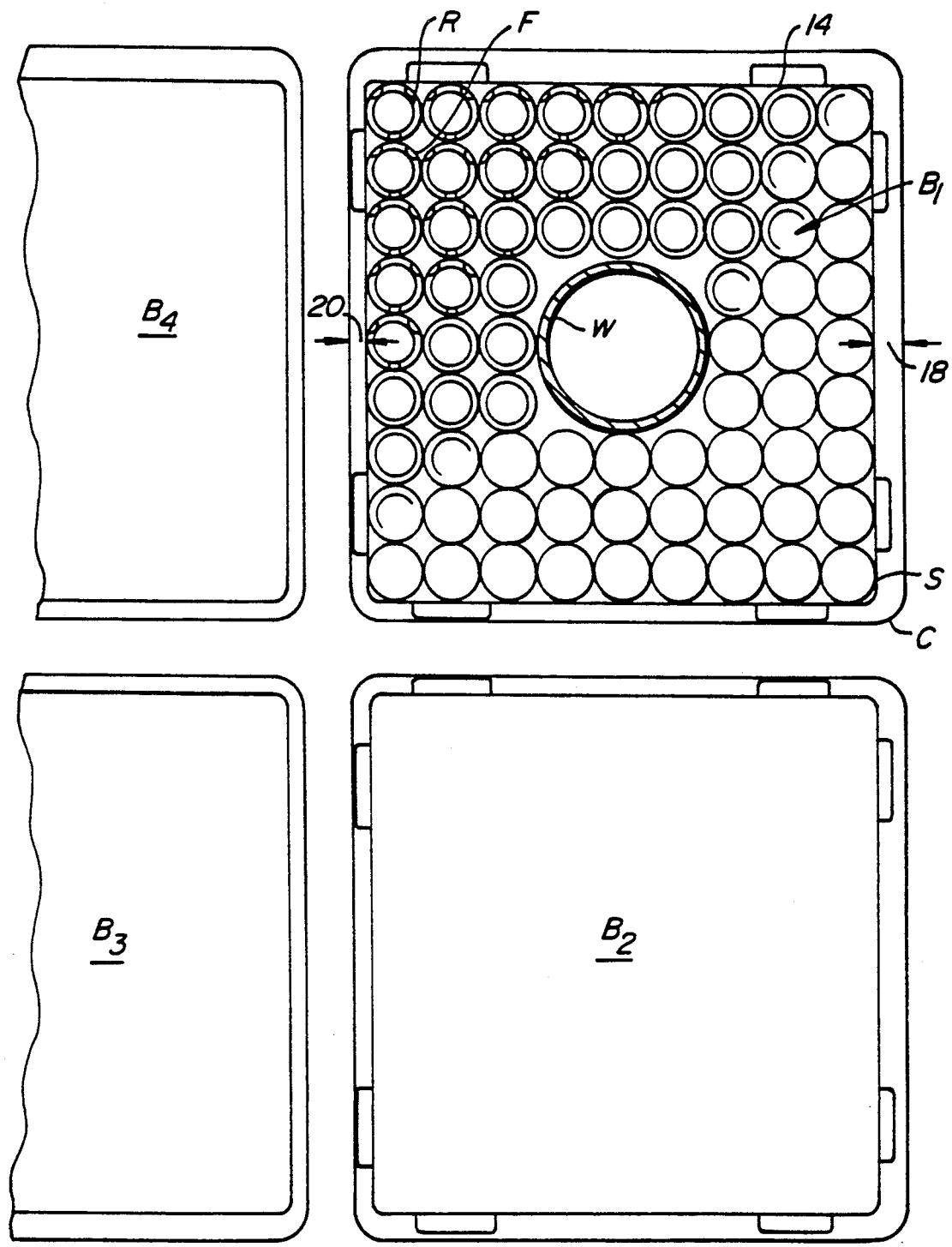
FIG. 2 is a plan section of a fuel bundle at a spacer surrounded by a channel with the adjacent cruciform core bypass region being shown illustrating the displacement of a spacer confined group of fuel rods to away from one channel wall so that fuel rods on the opposite side move in critical power restricting proximity to an opposite channel wall.

Referring to FIG. 2, bundle B1 is illustrated in section adjacent spacer S. The fuel bundle comprises a 9 by 9 matrix of fuel rods R with a central water rod W for supplying a high moderator fraction to the central portion of fuel bundle B1. It will be understood that there is a flow region for the generation of steam interior of the fuel bundles while the surrounding region R is flooded with water.

Attention can be devoted to the construction of spacer S. The illustrated spacer S is a so-called ferrule type spacer S have a matrix of interconnected ferrules F each surrounding a rod R at the elevation of the spacer. The spacers as a group are surrounded by band 14.

FIG. 2 is a cross-section that illustrates the prior art by showing over emphasized the difficulties of the prior art. Specifically, spacer S has moved to the left opening a large gap 18 with respect to one wall of channel C at small gap 20 and closing small gap 20 with respect to the remaining channel wall. As has heretofore been stated, this migration of spacer S as a group causes rods R adjacent channel C to be even more proximate moderator within region R (and become more reactive and generate more heat) while at the same time restricting the flow of moderator within the fuel bundle B1 adjacent the inside wall of channel C at small gap 20. This will cause the critical power of the peripheral fuel rods R at this location to decrease. Once the critical power decreases at one bundle location, the remainder of the fuel bundle B1 is required to be restricted in heat out put so that the critical power limit at a fuel rod R is no where exceeded within a fuel bundle.

Referring to FIGS. 3, 4, and 5, modification to band 14 is illustrated to prevent the prior art condition of FIG. 2. Band 14 (of a spacer S—the rest of the spacer being omitted for clarity) is shown with respective near sides 31, 32 and far sides 33, 34.

Referring to far sides 33, 34, it will be seen that side 33 is formed with protrusions 45, 46 while side 34 includes formed protrusions 47, 48. Referring to the detail of FIG. 4, it can be seen that these respective protrusions are "bath tub" like indentations impressed to the metal of band B and relatively thick—especially when compared to protrusions 41-44 described hereafter. It is the purpose of the four protrusions 45-48 to occupy a full centering interval between a channel C and a spacer S at band B (See FIG. 6).

Referring to near sides 31, 32, it will be seen that side 31 is formed with protrusions 41, 42 while side 32 includes formed protrusions 43, 44. Referring to the detail of FIG. 5, it can be seen that these respective protrusions are again "bath tub" like indentations impressed to the metal of band B and relative thin—especially when compared to protrusions 45-48. It is the purpose of the four protrusions 41-44 to occupy less than a full centering interval between a channel C and a spacer S at band B (See FIG. 6). This interval defined by the protrusions 41-44 with respect to channel C is chosen with two purposes in mind.

First, clearance is required to fit the channel C over the remainder of the assembled fuel bundle B during assembly. Accordingly, protrusions 41-44 are less than protrusions 45-48 by a sufficient interval to define this assembly clearance.

Second, a minimum interval is defined from the fuel rods R adjacent channel C to define a "worst case" critical power limit. Accordingly, protrusions 41-44 are dimensioned to provide this "worst case" critical power dimension.

Finally, it will be seen that near sides 31, 32 include leaf springs 61-64. It will suffice to discuss leaf spring 64 as illustrated in FIG. 5. It will be understood that springs 61-63 are identically constructed.

Referring to FIG. 5, leaf spring 64 is attached by some suitable means to band 14 at 65. Leaf spring 64 has an essentially U-shaped configuration imparted by bends at 65, 66, 67 and 68. A large raised central portion 70 resiliently bears against a channel C while the distal end 69 of spring 64 from attached portion 65 fits in sliding relation over the exterior of band 14.

Preferably, springs 61–64 are located adjacent the corners of channels C. In this location, they bear on channel C where the channels have maximum strength.

Function of springs 61–64 is plain to see in FIG. 6. Simply stated, springs 61–64 bias spacer S at band 14 on sides 31, 32 away from channel C. This causes registration of protrusions 45–48 to channel C with protrusions 41–44 being spaced apart from channel C. Centering of the confined fuel rods R within channel C occurs at the optimum interval established by protrusions 45–48 and the dimension of spacer S with respect to channel C.

We prefer the leaf springs 61–64 vertically disposed. Similarly, protrusions formed from "bath tub" like projections in the metal are shown. The reader will understand that protrusions and springs can include a wide variety of equivalents.

What is claimed is:

1. In a fuel bundle for a boiling water nuclear reactor, including a plurality of side-by-side vertically disposed sealed nuclear fuel rods, said fuel rods arrayed in a square section, a lower tie plate for supporting said fuel rods and permitting the entrance of water moderator to said fuel bundle between said fuel rods, an upper tie plate with at least some of the fuel rods fastened thereto and permitting the exit of water and generated steam from said fuel bundle, a plurality of vertically separated spacers surrounding each said fuel rod at the elevation of said spacer to hold said fuel rods in designed spaced apart relation as a unitary mass at the elevation of said spacers, each said spacer including a peripheral band having four sides, each of said sides corresponding to one of said sides of said square section, and a channel surrounding said lower tie plate, said upper tie plate and said fuel rods and spacers there between, said channel defining a complimentary and larger square section with respect to said square section of said square array of fuel rods, said channel during operation of said reactor defining a flow boundary between a core bypass region containing water moderator on the outside and a steam generating flow path through said fuel bundle between said tie plates on the inside, the improvement to the peripheral band of at least one spacer for maintaining required spatial separation between said fuel rods and channel for neutron moderation and steam generation comprising:

two first adjacent spacer sides defining at least two full dimension outward protrusions occupying the entire interval necessary to maintain the fuel rods adjacent all four sides at their full optimal spacing from the interior channel walls whereby said fuel rods adjoining said two adjacent spacer sides are maintained at an optimal spacing from said channel wall to assure optimum neutron moderation and moderator flow around said fuel rods to maintain optimum critical power on fuel rods adjacent said channel;

two second and remaining adjacent spacer sides defining lesser dimension outward protrusions occupying a sufficient and lesser interval to prevent inadvertent closing of the fuel rods adjacent said second and remaining adjacent spacer sides to the channel sides beyond said lesser interval, said lesser interval chosen to provide the peripheral fuel rods adjacent said second and remaining adjacent spacer sides with adequate clearance from said channel wall to maintain a safe level of neutron moderation and avoid a worst case critical power limitation; and spring means on said two second and remaining adjacent sides of the peripheral spacer band acting on the channel wall given sufficient force to bias the fuel rod matrix at the spacer away from the channel wall at said two second and remaining adjacent sides to register the full dimension outward protrusions at the first and adjacent spacer sides to the channel wall at the opposite sides of the spacer whereby said fuel rods adjoining said all spacer sides are maintained at an optimal spacing from said channel wall to assure optimum neutron moderation and moderator flow around said fuel rods to maintain optimum critical power on fuel rods adjacent said channel.

2. The fuel bundle of claim 1 wherein said spring means includes a leaf spring.

3. The fuel bundle of claim 2 and wherein said leaf spring is placed adjacent the corner of said channel.

4. The fuel bundle of claim 1 and wherein each peripheral band at said remaining sides includes paired spring means.

5. A fuel bundle for a boiling water nuclear reactor, comprising:

a plurality of side-by-side sealed vertically disposed nuclear fuel rods, said fuel rods arrayed in a square section;

a lower tie plate for supporting said fuel rods and permitting the entrance of water moderator to said fuel bundle between said fuel rods;

an upper tie plate with at least some of the fuel rods fastened thereto and permitting the exit of water and generated steam from said fuel bundle;

a plurality of vertically separated spacers surrounding each said fuel rod at the elevation of said spacer to hold said fuel rods in designed spaced apart relation as a unitary mass at the elevation of said spacers, each said spacer including a peripheral band having four adjacent sides; and, a channel surrounding said lower tie plate, said upper tie plate and said fuel rods and spacers there between, said channel defining a complimentary and larger square section with respect to said square section of said square array of fuel rods, said channel during operation of said reactor defining a flow boundary between a core bypass region containing water moderator on the outside and a steam generating flow path through said fuel bundle between said tie plates on the inside;

the peripheral band of at least one spacer having two first adjacent spacer sides defining at least two full dimension outward protrusions occupying the entire interval necessary to maintain the fuel rods adjacent all four sides at their full optimal spacing from the interior channel walls whereby said fuel rods adjoining said two adjacent spacer sides are maintained at an optimal spacing from said channel wall to assure optimum neutron moderation and moderator flow around said fuel rods to maintain optimum critical power on fuel rods adjacent said channel;

said peripheral band further including two second and remaining adjacent spacer sides defining lesser dimension outward protrusions occupying a sufficient and lesser interval to prevent inadvertent closing of the fuel rods adjacent said second and remaining adjacent spacer sides to the channel sides beyond said lesser interval, said lesser interval chosen to provide the peripheral fuel rods adjacent said second and remaining spacer sides with adequate clearance from said channel wall to maintain a safe level of neutron moderation and avoid a worst case critical power limitation; and, spring means on said two second and remaining adjacent sides of the peripheral spacer band acting on the channel wall given sufficient force to bias the fuel rod matrix at the spacer away from the channel wall at said two second and remaining adjacent sides to register the full dimension outward protrusions at the first and adjacent spacer sides to the channel wall at the opposite sides of the spacer whereby said fuel rods adjoining said all spacer sides are maintained at an optimal spacing from said channel wall to assure optimum neutron moderation and moderator flow around said fuel rods to maintain optimum critical power on fuel rods adjacent said channel.

6. The fuel bundle of claim 5 and wherein said spring means includes a leaf spring.

7. The fuel bundle of claim 6 and wherein said leaf spring is placed adjacent the corner of said channel.

8. In a spacer for fuel bundle for a boiling water nuclear reactor fuel bundle, said fuel bundle including a plurality of side-by-side vertically disposed sealed nuclear fuel rods, said fuel rods arrayed in a square section, a lower tie plate for supporting said fuel rods and permitting the entrance of water moderator to said fuel bundle between said fuel rods, and upper tie plate with at least some of the fuel rods fastened thereto and permitting the exit of water and generated steam from said fuel bundle, a channel surrounding said lower tie plate, said upper tie plate and said fuel rods and spacers there between, said channel defining a complimentary and larger square section with respect to said square section of said square array of fuel rods, said channel during operation of said reactor defining a flow boundary between a core bypass region containing water moderator on the outside and a steam generating flow path through said fuel bundle between said tie plates on the inside, said spacer comprising:

a spacer body for placement at a selected elevation between said tie plates, said spacer body for defining about each said fuel rod at a spacer position between said tie plates separation between said fuel rods for maintaining said fuel rods in designed side-by-side relation;

each said spacer including a square sectioned peripheral band having four sides;

two first adjacent spacer sides defining at least two full dimension outward protrusions occupying the entire interval necessary to maintain the fuel rods adjacent all four sides at their full optimal spacing from the interior channel walls whereby said fuel rods adjoining said two adjacent spacer sides are maintained at an optimal spacing from said channel wall to assure optimum neutron moderation and moderator flow around said fuel rods to maintain optimum critical power on fuel rods adjacent said channel;

two second and remaining adjacent spacer sides defining lesser dimension outward protrusions occupying a sufficient and lesser interval to prevent inadvertent closing of the fuel rods adjacent said second and remaining adjacent spacer sides to the channel sides beyond said lesser interval, said lesser interval chosen to provide the peripheral fuel rods adjacent said second and remaining spacer sides with adequate clearance from said channel wall to maintain a safe level of neutron moderation and avoid a worst case critical power limitation; and spring means on said two second and remaining adjacent sides of the peripheral spacer band acting on the channel given sufficient force to bias the fuel rod matrix at the spacer away from the channel wall at said two second and remaining adjacent sides to register the full dimension outward protrusions at the first and adjacent spacer sides to the channel wall at the opposite sides of the spacer whereby said fuel rods adjoining said all spacer sides are maintained at an optimal spacing from said channel wall to assure optimum neutron moderation and moderator flow around said fuel rods to maintain optimum critical power on fuel rods adjacent said channel.

9. The fuel bundle of claim 8 and wherein each peripheral band at said remaining sides includes paired spring means.

* * * * *